US008480093B2

(12) United States Patent
Skinner et al.

(10) Patent No.: US 8,480,093 B2
(45) Date of Patent: Jul. 9, 2013

(54) INTERNAL PIPE SEAL

(75) Inventors: James W. Skinner, Fort Wayne, IN (US); Ronald W. Neuhaus, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 198 days.

(21) Appl. No.: 12/187,473

(22) Filed: Aug. 7, 2008

(65) Prior Publication Data

US 2009/0051125 A1 Feb. 26, 2009

Related U.S. Application Data

(60) Provisional application No. 60/955,517, filed on Aug. 13, 2007.

(51) Int. Cl.
*F16L 21/02* (2006.01)
(52) U.S. Cl.
USPC ........................................................ 277/616
(58) Field of Classification Search
USPC .................. 277/616, 614, 314; 24/17 A, 279, 24/20 R–20 W, 19, 270, 271; 285/109, 910
See application file for complete search history.

(56) References Cited

U.S. PATENT DOCUMENTS

| | | | |
|---|---|---|---|
| 3,787,061 A * | 1/1974 | Yoakum | 277/605 |
| 3,856,245 A * | 12/1974 | Byerly | 248/74.3 |
| 3,960,395 A | 6/1976 | Cirule et al. | |
| 4,189,807 A | 2/1980 | Byerly | |
| 4,303,103 A | 12/1981 | Marks et al. | |
| 4,346,922 A | 8/1982 | Ohtsuga et al. | |
| 4,469,467 A | 9/1984 | Odill et al. | |
| 4,487,421 A * | 12/1984 | Housas et al. | 277/616 |
| 4,564,201 A | 1/1986 | Hannah | |
| 4,572,523 A * | 2/1986 | Guettouche et al. | 277/616 |
| 4,619,555 A | 10/1986 | Skinner et al. | |
| 4,624,486 A | 11/1986 | Nishino et al. | |
| 4,685,704 A | 8/1987 | Kolar | |
| 4,702,645 A | 10/1987 | Skinner et al. | |
| 4,890,863 A | 1/1990 | Westhoff et al. | |
| 4,916,799 A | 4/1990 | Skinner et al. | |
| 4,927,189 A | 5/1990 | Burkit | |
| 4,997,212 A | 3/1991 | Burkit | |
| 5,002,317 A | 3/1991 | Burkit | |

(Continued)

OTHER PUBLICATIONS

Office Action dated Aug. 23, 2011 in corresponding U.S. Appl. No. 12/409,656.

(Continued)

*Primary Examiner* — Shane Bomar
*Assistant Examiner* — Kipp Wallace
(74) *Attorney, Agent, or Firm* — Faegre Baker Daniels LLP

(57) ABSTRACT

A pipe sealing assembly for sealing a connection between a pair of pipes. The sealing assembly includes a generally cylindrical seal or gasket having a pair of axially spaced sealing portions joined by a bridge portion. Each sealing portion has a plurality of compressible sealing ridges, as well as an annular expansion band seat capable of receiving the expansion band of an expansion band assembly that is used to sealingly compress each sealing portion against a respective inner surface of a pipe. Additionally, each sealing portion may include a hollow section which houses the expansion band assembly, and may be provided with a small slit for installing the expansion band assembly and allowing access to the expansion mechanism of the expansion band assembly during installation, or a separate cover member for enclosing the expansion band assembly.

16 Claims, 4 Drawing Sheets

U.S. PATENT DOCUMENTS

| | | | |
|---|---|---|---|
| 5,044,822 A | 9/1991 | Moss | |
| 5,092,633 A | 3/1992 | Burkit | |
| 5,149,148 A * | 9/1992 | Taeuber et al. | 285/276 |
| 5,213,342 A | 5/1993 | Weber | |
| 5,224,741 A | 7/1993 | Burkit et al. | |
| 5,496,128 A | 3/1996 | Odill | |
| 5,507,500 A | 4/1996 | Skinner et al. | |
| 6,126,206 A | 10/2000 | Topf, Jr. | |
| 6,406,025 B1 * | 6/2002 | Westhoff et al. | 277/314 |
| 6,435,566 B1 * | 8/2002 | Topf, Jr. | 285/236 |
| 6,676,136 B2 | 1/2004 | Miller et al. | |
| 6,692,039 B2 | 2/2004 | Topf, Jr. | |
| 6,805,359 B2 | 10/2004 | Neuhaus et al. | |
| 7,146,689 B2 | 12/2006 | Neuhaus et al. | |
| 7,252,293 B2 | 8/2007 | Happel | |
| 7,263,746 B2 | 9/2007 | Neuhaus et al. | |
| 7,350,827 B2 | 4/2008 | Zeigler | |
| 7,461,848 B2 * | 12/2008 | Corbett, Jr. | 277/607 |
| 2005/0006853 A1 | 1/2005 | Neuhaus et al. | |
| 2005/0155189 A1 | 7/2005 | Komai et al. | |
| 2006/0175765 A1 | 8/2006 | Happel | |
| 2006/0208429 A1 | 9/2006 | Happel | |
| 2007/0116518 A1 | 5/2007 | Tortorici | |

OTHER PUBLICATIONS

Office Action dated Mar. 31, 2011 in corresponding Canadian Application No. 2,638,578.

* cited by examiner

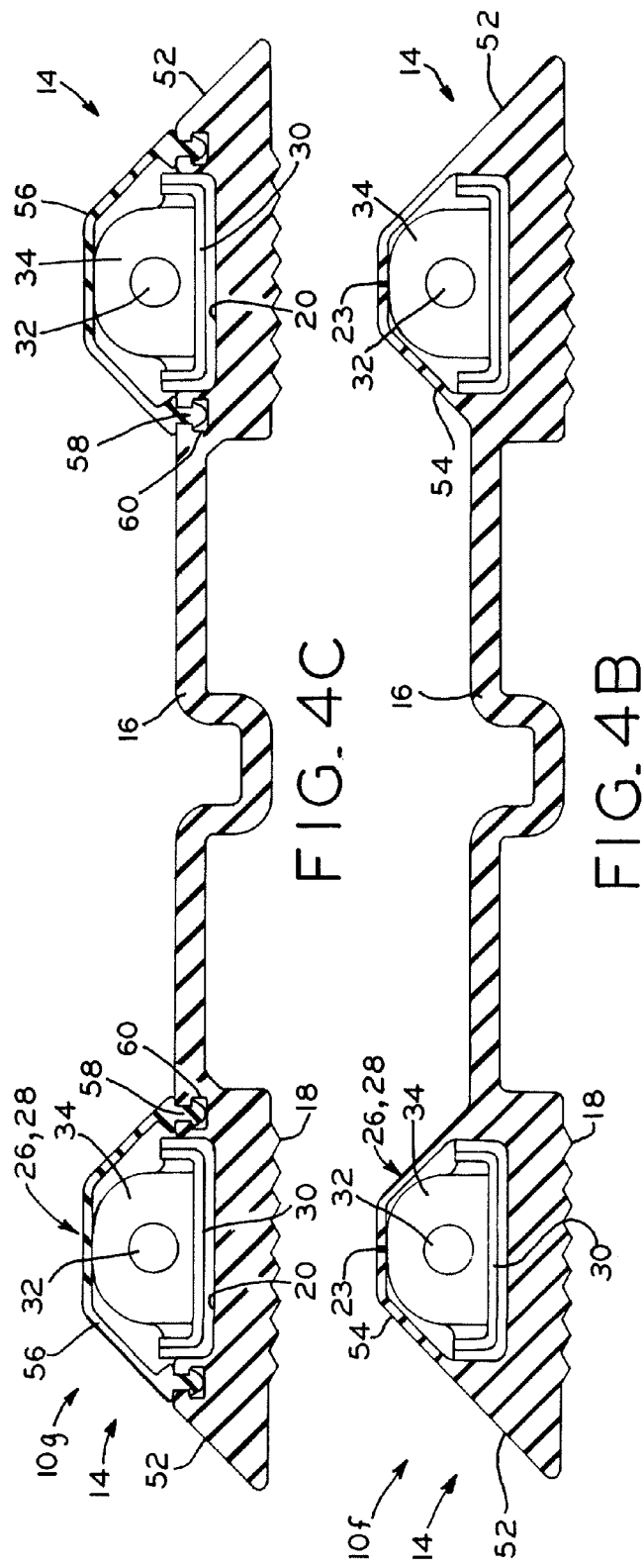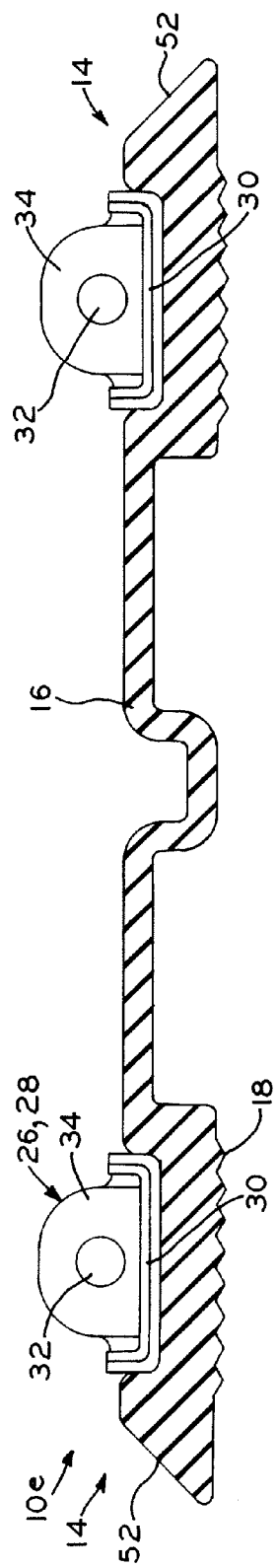

INTERNAL PIPE SEAL

CROSS-REFERENCE TO RELATED APPLICATIONS

This application claims the benefit under Title 35, U.S.C. §119(e) of U.S. Provisional Patent Application Ser. No. 60/955,517, entitled INTERNAL PIPE SEAL, filed on Aug. 13, 2007, the disclosure of which is expressly incorporated by reference herein in its entirety.

BACKGROUND OF THE INVENTION

1. Field of the Invention

The present invention relates to an internal sealing assembly for sealingly connecting a pair of pipes and, in one embodiment, relates to a secondary sealing assembly that can be installed within an existing pipeline about an existing pipe-to-pipe connection to seal a leak.

2. Description of the Related Art

Underground pipes which are used in municipal water and sewer systems, for example, typically include bell and spigot ends that are attached to one another in a sealed manner. Typically, either the spigot end or the bell end of such pipes includes a rubber seal which is compressed between the ends of the pipes to provide a sealed joint when the spigot end of one pipe is inserted into the bell end of another pipe. Occasionally, these primary joint seals between adjacent pipes may leak after installation in the field, requiring a secondary sealing assembly to seal the connection.

What is needed is an improved sealing assembly for sealing pipe-to-pipe joints.

SUMMARY OF THE INVENTION

The present invention provides a pipe sealing assembly for sealing a connection between a pair of pipes. The sealing assembly includes a generally cylindrical seal or gasket having a pair of axially spaced sealing portions joined by a bridge portion. Each sealing portion has a plurality of compressible sealing ridges, as well as an annular expansion band seat capable of receiving the expansion band of an expansion band assembly that is used to sealingly compress each sealing portion against a respective inner surface of a pipe. Additionally, each sealing portion may include a hollow section which houses the expansion band assembly, and may be provided with a small slit for installing the expansion band assembly and allowing access to the expansion mechanism of the expansion band assembly during installation, or a separate cover member for enclosing the expansion band assembly.

In one form thereof, the present invention provides a sealing assembly, including a cylindrical seal, including a pair of axially-spaced, annular sealing portions, each sealing portion including an expansion band seat and a wall section defining an annular hollow space proximate the expansion band seat; and a bridge portion joining the sealing portions; and a pair of expansion band assemblies respectively received within the hollow spaces, each expansion band assembly including an expansion band, the expansion bands respectively received within the expansion band seats; and an expansion mechanism.

In another form thereof, the present invention provides a sealing assembly, including a cylindrical seal, including a pair of axially-spaced, annular sealing portions, each sealing portion including an expansion band seat and a separate cover member attachable to the sealing portion to define an annular hollow space proximate the expansion band seat; and a bridge portion joining the sealing portions; and a pair of expansion band assemblies respectively received within the hollow spaces, each expansion band assembly including an expansion band, the expansion bands respectively received within the expansion band seats; and an expansion mechanism.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIGS. 4A-C are sectional views through three further embodiments of sealing assemblies according to the present invention.

Corresponding reference characters indicate corresponding parts throughout the several views. The exemplifications set out herein illustrate embodiments of the invention, and such exemplifications are not to be construed as limiting the scope of the invention any manner.

DESCRIPTION OF THE INVENTION

Figure 1:
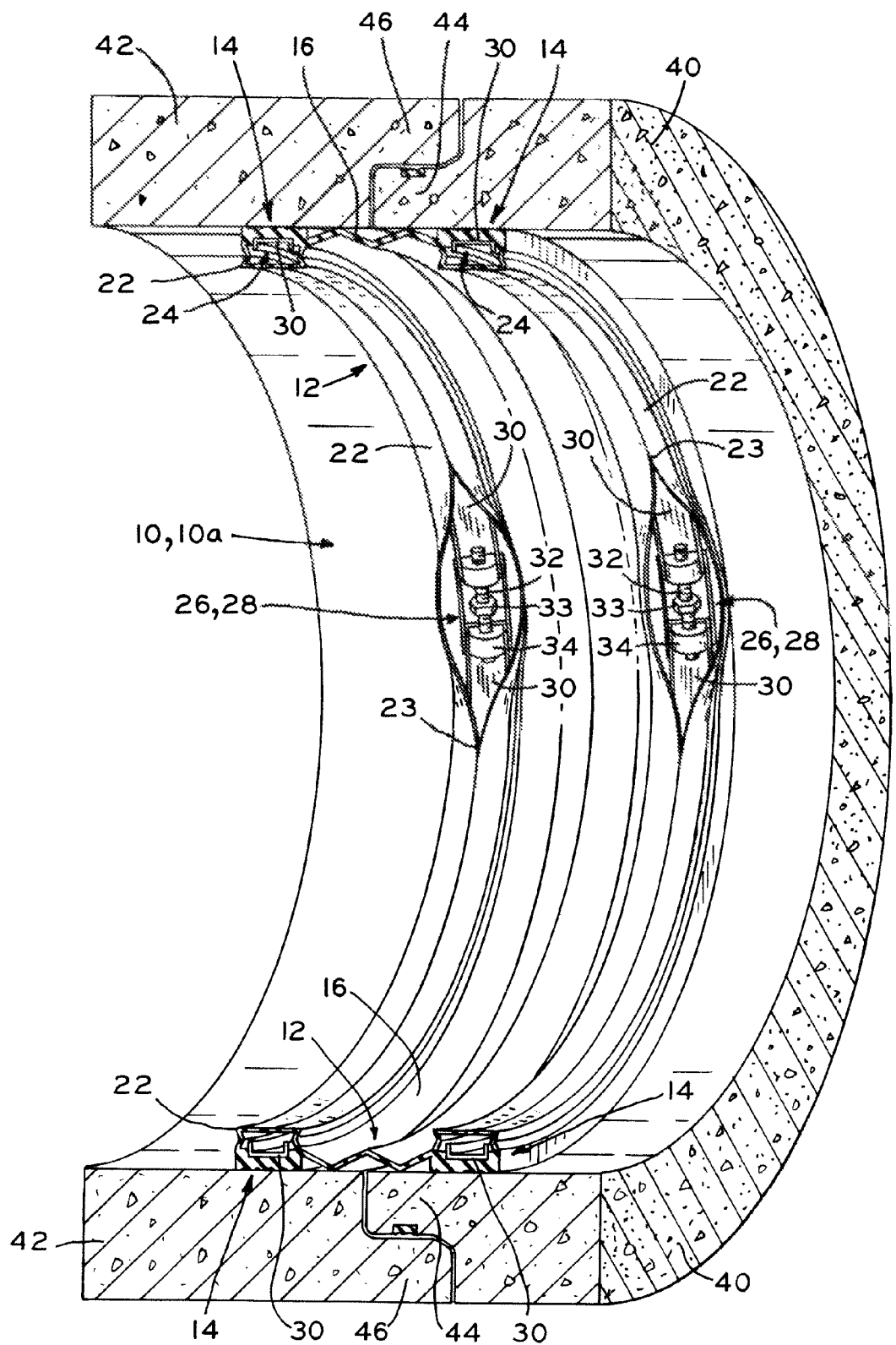
FIG. 1 is a perspective view of a sealing assembly according to one embodiment of the present invention, shown sealing a connection between a pair of pipes.

Referring to FIGS. 1 and 2A-D, four different embodiments of sealing assembly 10 of the present invention are shown. Except as discussed below, each sealing assembly 10a-10d includes a number of identical or substantially identical components, and identical reference numerals will be used throughout FIGS. 2A-D to designate identical or substantially identical components therebetween.

Each sealing assembly 10 includes a generally cylindrically shaped seal 12 having pair of axially spaced sealing portions 14 connected by a bridge portion 16. Bridge portion 16 may include one or more undulations as shown in order to permit movement of sealing portions 14 toward and away from one another along their common axis, i.e., an axis passing through the center of seal 12. Seal 12 may be made of extruded rubber, for example, in a manner in which a length of rubber section is extruded, and then is cut to a predetermined length, followed by splicing the ends of the section together to form the cylindrical seal 12. Seal 12 may also be made of a resilient plastic material by an injection molding process, for example.

Each sealing portion 14 includes a plurality of sealing ridges 18 that are compressible against the internal surface of a pipe to provide a fluid tight seal. Additionally, each sealing portion 14 further includes an annular expansion band seat 20, shown herein as an annular recessed area of sealing portions 14, for receiving an expansion band of an expansion mechanism, as discussed below.

Figure 2A:
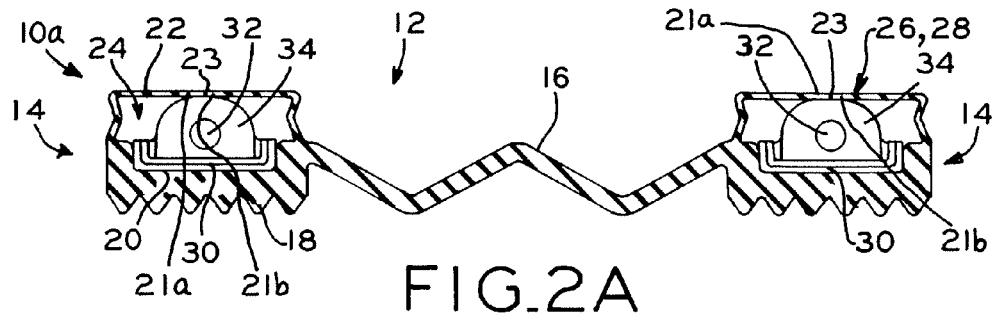
FIGS. 2A-D are sectional views through four different embodiments of sealing assemblies according to the present invention.
Figure 2B:
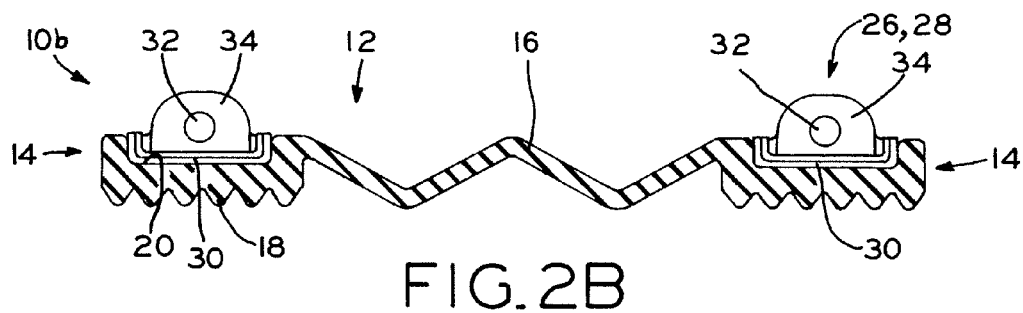
Figure 2C:
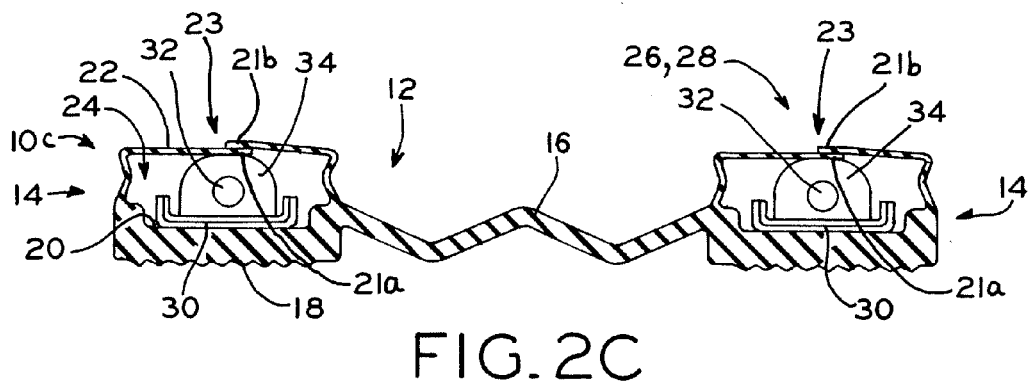
Figure 2D:
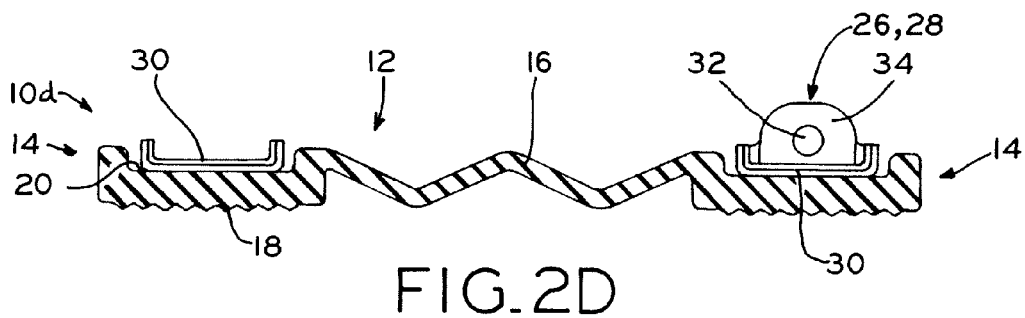

Additionally, as shown with respect to the embodiments of FIGS. 1, 2A and 2C, each sealing portion 14 may also be provided with a thin wall section 22 defining an annular hollow section 24 in the sealing portion 14 which accommodates the expansion band and the expansion mechanism of the expansion band assembly. As discussed below, the thin wall section 22 may include a small slit 23 for installation of the expansion band and expansion mechanism and for accessing the expansion mechanism during installation for sealingly compressing the sealing portion 12 into fluid tight engagement with the interior surface of the pipe.

Expansion band assembly 26 may be, for example, of the type disclosed in U.S. Pat. Nos. 6,805,359 and 7,146,689, each assigned to the assignee of the present invention, the disclosures of which are expressly incorporated herein by reference. Each expansion band assembly 26 generally includes an expansion mechanism 28 operable to expand the diameter of an expansion band 30 of the expansion band assembly 26 to radially outwardly to compress a sealing portion 14 against the inner surface of a pipe. In particular, as best shown in FIG. 1 and discussed in the above-incorporated U.S. Pat. Nos. 6,805,359 and 7,146,689, each expansion mechanism 28 generally includes a bolt 32 having oppositely-threaded ends and a central nut 33. The oppositely-threaded ends of bolt 32 are threadingly received within a pair of oppositely-threaded block members 34 which are in engagement with the opposite ends 30a and 30b of expansion band 30. In use, nut 33 of bolt 32 is engaged by a suitable tool to rotate bolt 32 and drive block members 34 apart from one another to thereby expand the diameter of expansion band 30 to radially outwardly compress a sealing portion 14 of seal 10 into tight engagement with the inner surface of a pipe.

Figure 3:
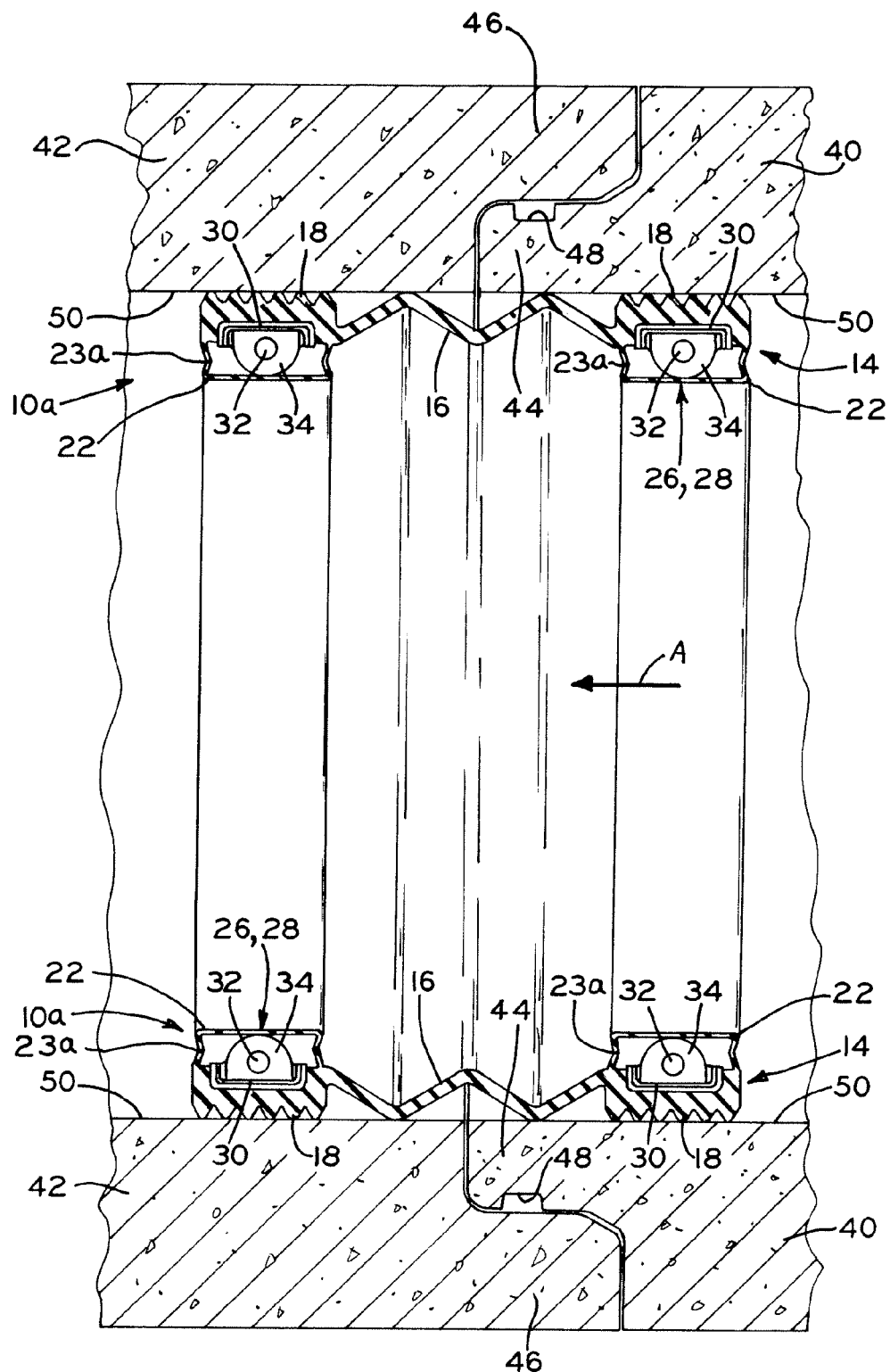
FIG. 3 is a partial sectional view through a pipe joint, showing the sealing assembly of FIG. 2A installed therein.

In use, referring additionally to FIG. 3 in which seal assembly 10a is shown as an example, seal assembly 10 may be used to seal a defective primary seal in a pipe-to-pipe connection between pipes 40 and 42, such as the connection between spigot end 44 of pipe 40 and socket end 46 of pipe 42 in which a primary seal (not shown), formed in an annular groove 48 of spigot end 44 of first pipe 40, is ineffective. Alternatively, seal assembly 10 may be used a primary seal to seal pipes 40 and 42 upon initial connection and installation of pipes 40 and 42.

Seal 12 is placed within the pipes 40 and 42 such that one sealing portion 14 is positioned adjacent spigot end 44 of pipe 40 and the other sealing portion 14 is positioned adjacent socket end 46 of pipe section 42, with bridge portion 16 of seal 12 bridging the gap between pipes 40 and 42. Thereafter, expansion mechanisms 28 of expansion band assemblies 26 are actuated in the manner described above to outwardly radially compress sealing portions 14 and their sealing ridges 18 of seal 12 into fluid tight sealing engagement with the inner surfaces 50 of pipes, respectively, thereby providing a fluid tight seal between pipes 40 and 42.

In the embodiments in which sealing portions 14 include thin wall sections 22, one or more slits 23 may be formed, or may be cut in the field, in wall sections 22 which allow for expansion bands 30 and expansion mechanisms 28 of expansion band assembly 26 to be slidably inserted within annular hollow sections 24. The slit 23 may be disposed adjacent an expansion mechanism 28 to allow access to expansion mechanism 28 during installation to effect the seal as described above. Each slit 23 may extend around only a portion of the circumference of its wall section 22, such as around as little as 5°, 10°, or 15°, or as great as 30°, 60°, 90° or more, for example, of the circumference of wall sections 22, or alternatively, may extend around the entire circumference of wall sections 22.

The adjacent portions 22a and 22b of thin wall sections 22 defined by slits 23 may be disposed in tight abutting end-to-end contact with one another, as shown in the embodiment of FIG. 2A, for example, or may overlap one another, as shown in the embodiment of FIG. 2C, for example, in order to minimize or prevent fluid entry into hollow sections 24. Further, as shown in FIG. 3, the slits 23 may be optionally disposed on a side of sealing portions 14 opposite a direction of fluid flow along arrow A, such as at location 23a, for example, to minimize or prevent fluid entry into hollow sections 24. Also, the expansion mechanisms 28 may be positioned at the upper end of the pipes 40 and 42 which are normally above the fluid level of the pipes to prevent or eliminate fluid entry into hollow sections 24.

Sealing assemblies 10 for small diameter pipes, such as up to 24 inches, may include one expansion mechanism 28, while sealing assemblies 10 for larger diameter pipes, such as greater than 24 inches, may include more than one expansion mechanism 28, as needed.

Referring to FIGS. 4A-C, sealing assemblies 10e-f according to further embodiments are shown, which, except as described above, are installed and function in the same manner as the embodiments discussed above, and identical reference numerals are used to identify identical or substantially identical components therebetween.

Sealing assembly 10e of FIG. 4A includes a ramp portion 52 at each of the ends of sealing portions 14 thereof to aid in directing a smooth or laminar flow of liquid within pipes 40 and 42 over and around the sealing assembly.

Sealing assembly 10f of FIG. 4B includes ramp portions 52 at each of the ends of sealing portions 14 thereof similar to sealing assembly 10e of FIG. 4A, and also includes thin wall sections 54 similar to thin wall sections 22 of the embodiments discussed above, wherein thin wall sections 54 are also ramped complementary with ramp portions 52 to aid in directing the flow of liquid within pipes 40 and 42 over and around the sealing assembly.

Sealing assembly 10g of FIG. 4C includes a pair of separately extruded, or otherwise separately formed, annular cover members 56 each having a pair of barbed ends 58 for snap-fitting engagement with a pair of respective grooves 60 in sealing portions 14 of sealing assembly 10g that are disposed in either side of the expansion band seats 20. Cover members 56 are also ramped complementary with ramp portions 52 to aid in directing the flow of liquid within pipes 40 and 42 over and around the sealing assembly. In use, either before or after the seal 10 of sealing assembly 10g is extruded, the expansion bands 30 and expansion mechanisms 28 are assembled in place, and an amount of adhesive, such as a liquid solvent adhesive, is applied within grooves 60 in sealing portions 14. Thereafter, barbed ends 58 of cover members 56 are snap-fitted within grooves 60 to initially retain cover members 56 in place, covering expansion bands 30 and expansion mechanisms 28 until the adhesive cures to provide a more permanent connection of cover members 56 to sealing portions 14.

Cover members 56 may also include slits, such as slits 23 described above, adjacent expansion mechanisms 28 for allowing access to expansion mechanisms during installation. Alternatively, cover members 56 that lack such slits may be secured to seal 12 in the manner described above after expansion mechanisms 28 are actuated following installation to thereby seal expansion mechanisms 28 within sealing assembly 10g in a fluid tight manner.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing assembly, comprising:
   a cylindrical seal, comprising:
      a pair of axially-spaced, annular sealing portions, at least one of said pair of sealing portions including an expansion band seat and a wall section defining an annular hollow space proximate said expansion band seat, said wall section including an access into said annular hollow space extending around only a portion of a circumference of said wall section; and
      a bridge portion joining said sealing portions; and
   at least one expansion band assembly received within said hollow space, said expansion band assembly comprising:
      an expansion band received within said expansion band seat; and
      an expansion mechanism.

2. The sealing assembly of claim 1, wherein said expansion band includes a pair of end portions, and said expansion mechanism further includes a drive mechanism, comprising:
   a pair of block members each having a threaded bore therethrough, said block members removably engaged with respective end portions of said ring; and
   a bolt including oppositely-threaded ends respectively threaded within said bores of said block members, wherein rotation of said bolt in a first direction causes said block members to be simultaneously driven apart from one another to thereby expand said ring.

3. The sealing assembly of claim 1, wherein said access in said wall section comprises a slit, said slit defining a pair of end portions of said wall section.

4. The sealing assembly of claim 3, wherein said end portions are in tight abutting engagement with one another.

5. The sealing assembly of claim 1, wherein at least one of said sealing portions is formed with a ramped portion adjacent said clamping band seat.

6. The sealing assembly of claim 1, wherein each sealing portion further includes a series of compressible, annular sealing ridges.

7. The sealing assembly of claim 1, wherein said expansion mechanism is disposed proximate said access and said expansion band is contained within said annular hollow space, such that said expansion mechanism is accessible through said access and said expansion band is inaccessible through said wall section.

8. The sealing assembly of claim 1, wherein said access extends between 5 degrees and 90 degrees around said circumference of said wall section.

9. The sealing assembly of claim 1, wherein said access faces radially inwardly.

10. The sealing assembly of claim 1, wherein said wall section of at least one of said pair of sealing portions comprises a cover member.

11. The sealing assembly of claim 10, wherein said cover member and an adjacent one of said pair of sealing portions comprises a snap-fit structure for snap-fitting attachment of said cover member to said sealing portions.

12. The sealing assembly of claim 11, wherein said snap-fit structure includes barbed ends of said cover members that are received within grooves of said sealing portions.

13. The sealing assembly of claim 10, wherein each said expansion band includes a pair of end portions, and each said expansion mechanism further includes a drive mechanism, comprising:
   a pair of block members each having a threaded bore therethrough, said block members removably engaged with respective end portions of said ring; and
   a bolt including oppositely-threaded ends respectively threaded within said bores of said block members, wherein rotation of said bolt in a first direction causes said block members to be simultaneously driven apart from one another to thereby expand said ring.

14. The sealing assembly of claim 10, wherein each sealing portion further includes a series of compressible, annular sealing ridges.

15. The sealing assembly of claim 10, wherein at least one of said sealing portions is formed with a ramped portion adjacent said clamping band seat.

16. The sealing assembly of claim 10, in combination with a pair of pipes sealingly connected by said sealing assembly, wherein said slits are formed on portions of said wall sections that are disposed away from a direction of fluid flow through said pipes.

* * * * *